Figure 1:
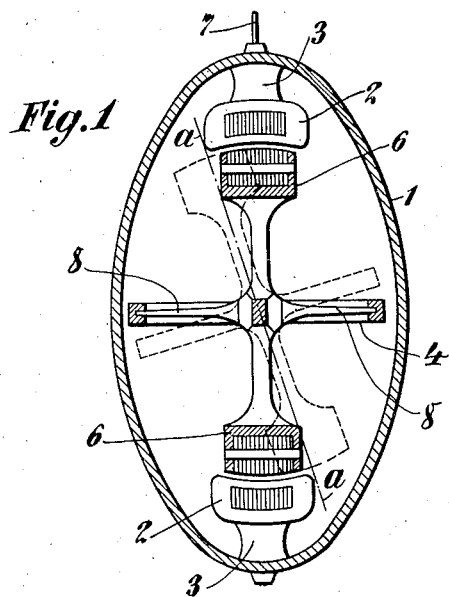

April 21, 1931.  A. CHESSIN  1,802,108

MOTOR

Original Filed Dec. 23, 1919

Inventor:
Alexander Chessin

Patented Apr. 21, 1931

1,802,108

UNITED STATES PATENT OFFICE

ALEXANDER CHESSIN, OF BROOKLYN, NEW YORK

MOTOR

Original application filed December 23, 1919, Serial No. 346,921. Divided and this application filed May 28, 1928. Serial No. 281,080.

My invention relates to motors and, more particularly, to motors of the character described in my Patent No. 1,677,331, issued on July 17, 1928, for gyroscopic apparatus. In the aforesaid patent, I have shown various motors suspended or mounted for rotation about a vertical axis and characterized by the freedom of the stator and the rotor to tilt relatively to one another about a horizontal axis. Such a motor was shown to act as a gyroscopic compass under conditions fully discussed in said patent application. However, a motor of this character is capable of other applications. In the present case, the invention is discussed with reference to its general use, in addition to its use as a compass. For example, the tiltable feature of the two component parts of the motor may be utilized to provide it with a certain degree of elasticity or adjustability in so far as the relative positions of the stator and the rotor are concerned, especially when the rotor has a high speed, the tiltable feature permitting the rotor to automatically align itself with regard to the stator, thereby doing away with the vibrations caused by any inaccuracy in the alignment of the rotor shaft when the latter runs in fixed bearings.

In the drawings, only one form of electric motor is shown. It is not deemed necessary to illustrate other forms of electric motor, such, for instance, where the positions of the stator and the rotor are reversed, i. e. where the stator is located within the rotor, instead of the rotor being disposed within the stator, as in the illustration shown in the drawings. Nor is it deemed necessary to show motors other than electric, such, for instance, as the air driven motor illustrated in Figure 3 of my patent above referred to, since the present discussion applies to all forms of motors comprising a stator and a rotor, and one form of such a motor serves as well to make the invention clear as would a dozen of them.

Figure 2:
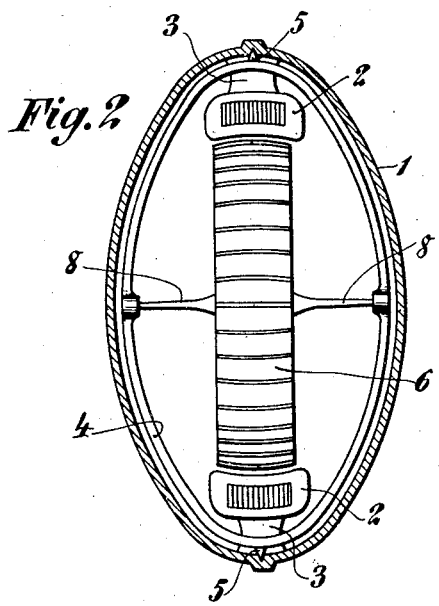

Figure 1 is a vertical cross section of a suspended motor embodying my invention.
Figure 2 is a horizontal cross section of the same motor. These figures are identical with Figures 1 and 2 of my Patent No. 1,677,331.

In these figures, 1 is a cross section of a casing which contains an induction motor; 2 is the stator of this induction motor and forms an integral part of the casing with which it is connected by means of extensions 3 which are arranged to leave open spaces for the swinging of the ring 4. This ring 4 is rotatably mounted in the casing 1 at 5 and carries the axle 8 of the rotor 6. The casing 1 is shown as suspended on a wire 7. The suspension may be torsionless, allowing the motor to freely rotate about the vertical, in which case the apparatus works like the gyroscopic compass described in my Patent No. 1,677,331. Of course, the wire 7 may be omitted, and the motor supported in any standard manner when used for other purposes.

When the rotor axle 8, which is normally horizontal, is deflected from the horizontal position for some reason, into the position indicated by the dotted lines in Figure 1, the magnetic pull between the stator and the rotor will draw the latter back into its normal position indicated by the full lines. If the rotor is suspended for rotation about the vertical, the effect of the magnetic pull on the rotor, which is a form of gyroscope, is to cause the entire motor to rotate about the vertical in accordance with the law of precession of gyroscopes. How the tendency of this rotor-gyroscope to preserve its direction in space and, therefore, to tilt relatively to the stator, as the direction of the horizontal in space changes with the rotation of the earth, causes the suspended motor to settle in the meridian of the place after a series of damped oscillations, is fully described and explained in my Patent No. 1,677,331. It is sufficient to record the fact here. The feature with which we are now concerned is mainly the tendency of the rotor to return to its normal position relatively to the stator when deflected therefrom for any reason whatsoever, this return being effected by the electromagnetic pull between the stator and the rotor, whether the motor be suspended, or not. The only difference between the cases of the motor suspended for rotation and the one supported in a standard manner is that, in the first case, there will be a rotation of the entire motor about the line of suspension, in addition to the alignment of the rotor axle relatively to the stator.

I claim:

1. A motor comprising a stator and a rotor having a uniform clearance and free to tilt relatively to one another subject only to the internal forces of said motor.

2. An electric motor comprising a stator and a rotor having a uniform air gap and free to tilt relatively to one another subject only to the magnetic pull between said stator and said rotor.

3. An electric motor comprising a stator and a rotor, the rotor being carried in a frame which is mounted in the stator to freely tilt about an axis perpendicular to the axis of said rotor subject only to the magnetic pull between said stator and said rotor.

4. A motor comprising two elements, a stator and a rotor, one of said two elements being carried in a frame which is mounted to tilt in the other one of said elements about an axis perpendicular to the axis of the element carried in said frame subject only to the interaction of forces between said stator and said rotor.

5. An electric motor comprising two elements, a stator and a rotor, the axis of one of said two elements being pivoted in a frame which is mounted to tilt in the other one of said elements about an axis perpendicular to said first mentioned axis subject only to magnetic pull between said stator and said rotor.

6. A motor comprising a stator and a rotor, said rotor being carried in a frame which is mounted to tilt in said stator about an axis perpendicular to the rotor axis subject only to the interaction of forces between said stator and said rotor.

ALEXANDER CHESSIN.